(12) United States Patent
Bhargava M R et al.

(10) Patent No.: US 11,327,857 B2
(45) Date of Patent: May 10, 2022

(54) FASTER REPLAY OF METADATA AND DATA OPERATIONS USING INODE NUMBER BASED DEPENDENCY GRAPH

(71) Applicant: NetApp Inc., Sunnyvale, CA (US)

(72) Inventors: Rakesh Bhargava M R, Bangalore (IN); Krishna Murthy Chandraiah setty Narasingarayanapeta, Bangalore (IN)

(73) Assignee: NetApp Inc., San Jose, CA (US)

( * ) Notice: Subject to any disclaimer, the term of this patent is extended or adjusted under 35 U.S.C. 154(b) by 326 days.

(21) Appl. No.: 15/945,178

(22) Filed: Apr. 4, 2018

(65) Prior Publication Data

US 2019/0311049 A1     Oct. 10, 2019

(51) Int. Cl.

| | | |
|---|---|---|
| *G06F 11/20* | (2006.01) | |
| *G06F 16/178* | (2019.01) | |
| *G06F 16/14* | (2019.01) | |
| *G06F 16/16* | (2019.01) | |
| *G06F 16/182* | (2019.01) | |
| *G06F 16/901* | (2019.01) | |

(52) U.S. Cl.
CPC ...... *G06F 11/2064* (2013.01); *G06F 11/2071* (2013.01); *G06F 11/2082* (2013.01); *G06F 16/152* (2019.01); *G06F 16/166* (2019.01); *G06F 16/178* (2019.01); *G06F 16/183* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 7,191,284 | B1* | 3/2007 | Gupta | G06F 11/2064 |
| | | | | 711/114 |
| 7,457,830 | B1* | 11/2008 | Coulter | G06F 11/1471 |
| 8,838,539 | B1* | 9/2014 | Ashcraft | H04L 49/9005 |
| | | | | 707/637 |
| 2008/0010322 | A1* | 1/2008 | Lee | G06F 16/184 |
| 2014/0222878 | A1* | 8/2014 | Avati | G06F 11/30 |
| | | | | 707/827 |
| 2017/0091299 | A1* | 3/2017 | Ngan | G06F 16/178 |
| 2017/0147601 | A1 | 5/2017 | Kaushik et al. | |
| 2017/0149886 | A1 | 5/2017 | Shetty | |
| 2017/0177658 | A1* | 6/2017 | Lee | G06F 16/273 |
| 2017/0185306 | A1 | 6/2017 | Eisler et al. | |

OTHER PUBLICATIONS

International Search Report and Written Opinion cited in PCT/US2019/024771 dated Aug. 2, 2019, 17 pages.

\* cited by examiner

*Primary Examiner* — Polina G Peach
*Assistant Examiner* — Anugeetha Kunjithapatham
(74) *Attorney, Agent, or Firm* — Cooper Legal Group, LLC

(57) ABSTRACT

Techniques are provided for replay of metadata and data operations. During initial execution of operations, identifiers of objects modified by the execution of each operation are identified and stored in association with the operations. When the operations are to be replayed (e.g., executed again, such as part of a replication operation or as part of flushing content from a cache to persistent storage), the identifiers are evaluated to determine which operations are independent with respect to one another and which operations are dependent with respect to one another. In this way, independent operations are executed in parallel and dependent operations are executed serially with respect to the operations from the dependent operations depend.

19 Claims, 7 Drawing Sheets

FASTER REPLAY OF METADATA AND DATA OPERATIONS USING INODE NUMBER BASED DEPENDENCY GRAPH

BACKGROUND

A computing system, such as a client device, a storage environment, a server, a distributed network, or a cloud computing environment, processes data operations and metadata operations. Data operations comprise read operations to read data from objects such as files and write operations that write data to objects. Metadata operations comprise other types of operations, such as create operations, link operations, unlink operations, set attribute operations, rename operations, expand size operations, etc. The operations are executed by a file system of the computing system in a particular order, and thus objects are modified by the executed operations in a particular order.

Two situations where the operations may be replayed (e.g., executed again) are replication of the operations and replay of the operations from a non-volatile random access memory (NVRAM) to a storage device after a system panic. In one example, data of the computing device is replicated to a second computing device, such as where data within a primary volume hosted by the computing device is replicated to a secondary volume hosted by the second computing device. In particular, the computing device may locally implement incoming operations upon the primary volume, and may replicate the incoming operations as replicated operations that are transmitted to the second computing device for replay (e.g., for execution upon the secondary volume). Because the state of the secondary volume should be consistent with the state of the primary volume (e.g., the same data, file structure, etc.), the order with which the incoming operations were locally implemented (e.g., the order with which the objects were modified by the operations) should be preserved at the second computing device. This can be achieved by assigning sequence numbers to operations according to the order with which the operations were executed, and then serially executing the replicated operations according to the sequence numbers. Otherwise, the secondary volume will not be consistent with the primary volume.

In another example, incoming operations are executed upon the NVRAM and are tracked using a non-volatile log (NVLog) of a node. When a replay triggering event occurs (e.g., the node panics, the node is taken over by a high availability partner node, the node boots up, etc.), the operations tracked within the NVLog are replayed. The operations must be replayed in the same order to ensure consistency.

Sequence numbers are used to enforce the replay order of operations. The sequence numbers and certain rules are used to replay the operations in a manner that is consistent with the state of objects originally modified by the initial execution of the operations. In some instances, data operations can be performed in parallel when the data operations are independent of one another (e.g., a write operation to file 1 and a write operation to file 2) while dependent data operations are performed serially (e.g., a first write operation to range 1 of the file 1 and a second write operation to a range 2 of the file 1 that overlaps with the range 1). However, current replay techniques have technical limitations of being unable to determine whether metadata operations are dependent or independent with respect to other operations. Thus, metadata operations are performed serially and are mutually exclusive with write operations. Forcing metadata operations to be serially performed in order to achieve consistency results in degrade operation of the computing system because client latency is significantly increased, the time and computing resources used to replay operations is increased, etc. In one example, the decision to replay operations independently or serially may be performed at a volume level, and thus operations directed to two different volumes are already considered independent upon one another.

DETAILED DESCRIPTION

Figure 1:
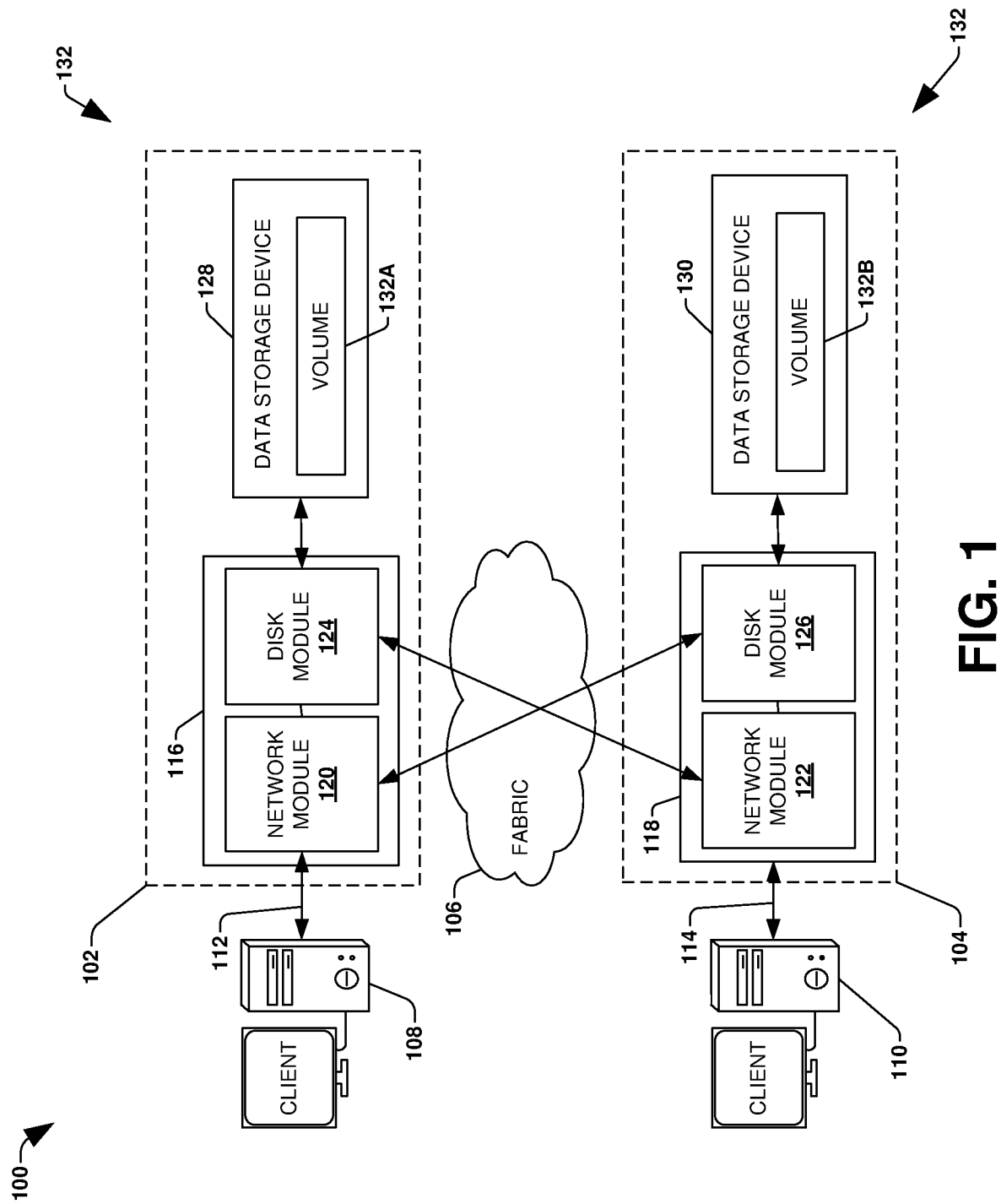
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for replay of metadata and data operations are provided herein. This replay technique provides a technical solution to a technical problem deep rooted in computing technology of how to identify independent operations that can be replayed in parallel and dependent operations that must be replayed serially. Conventional replay techniques are unable to determine whether metadata operations are independent or dependent with respect to other operations, and thus are replayed serially and mutually exclusive to write operations. This significantly increase the time to replay operations, which can affect client latency and accessibility to data.

Accordingly, this replay technique provides significantly more than conventional replay techniques by tracking what objects (e.g., files, inodes, directories, etc.) are affected (e.g., modified) by an initial execution of a metadata operation. Thus, when the metadata operation is replayed, the metadata operation may potentially be executed in parallel with other operations that do not affect the same objects. In this way, operations can be replayed in a manner that provides data consistency and reduces latency and resource usage otherwise wasted by only replaying metadata operations in serial.

To provide for replay of metadata and data operations, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that replay of metadata and data operations may be implemented within the clustered network environment 100. In an example, operations may be executed at node 116 and replayed at node 118. It may be appreciated that replay of metadata and data operations may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
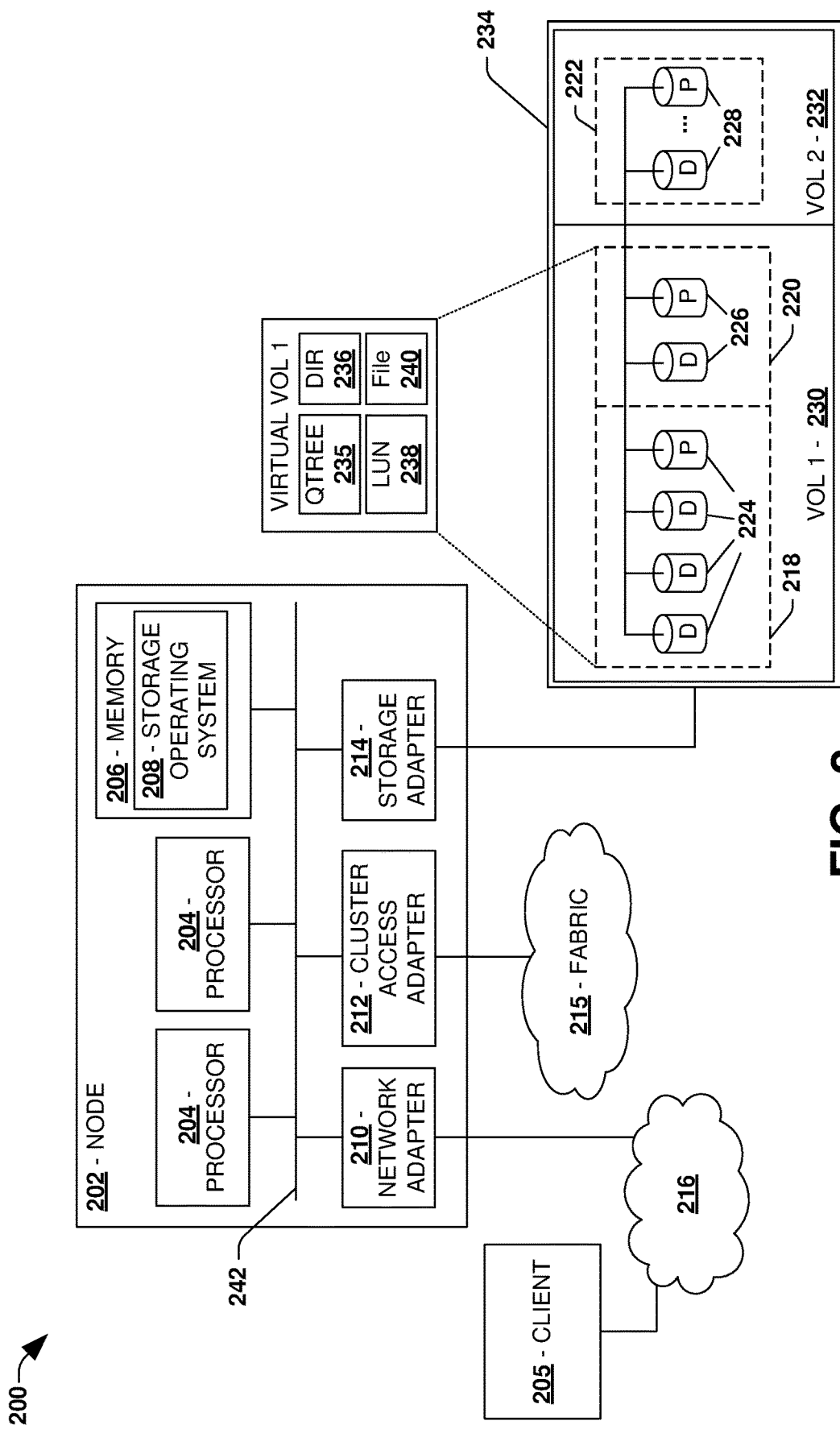
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that replay of metadata and data operations may be implemented for the data storage system 200. In an example, the node 202 may execute operation upon an NVRAM and replay the operations to flush the NVRAM to storage. It may be appreciated that replay of metadata and data operations may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
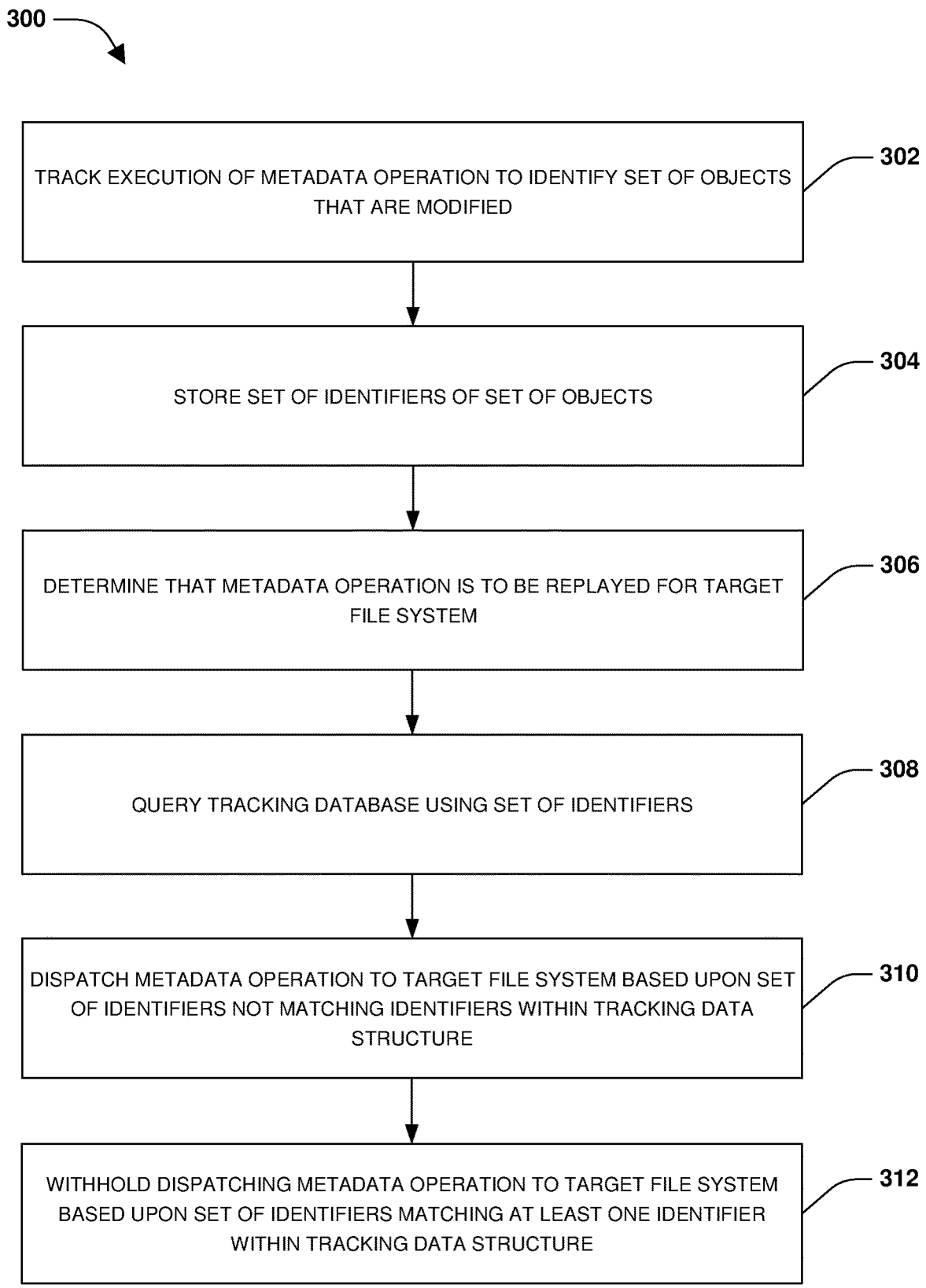
FIG. 3 is a flow chart illustrating an example method for replaying metadata and data operations.

One embodiment of replaying metadata and data operations is illustrated by an exemplary method 300 of FIG. 3. A first computing environment (e.g., a client device, a server, a cloud computing environment, etc.) may process data operations that read data from and write data to objects, such as files, LUNs, and other storage objects. The first computing environment may also process metadata operations, such as operations that create objects, rename objects, delete objects, set attributes for objects, and/or perform other operations upon objects such as files, directories, inodes, LUNs, volumes, etc. The first computing environment may comprise a first file system that stores data within volumes or other data containers, and thus the first file system executes the operations.

At 302, execution of a metadata operation is tracked to identify a set of objects that are modified by the execution of the metadata operation. The set of objects may comprise of files and/or directory inodes that are modified by the metadata operation. In one example, execution of a create object metadata operation is tracked to determine that the create object metadata operation modifies a parent directory object and a new object being created within the parent directory object by the create object metadata operation. Thus, the set of objects are identified as comprising the parent directory object and the new object.

In another example, execution of a link object metadata operation is tracked to determine that the link object metadata operation modifies an inode object to which a new link is to be established and a new parent directory hosting the new link. Thus, the set of objects are identified as comprising the inode object and the new parent directory. In another example, execution of an unlink object metadata operation is tracked to determine that the unlink object metadata operation modifies an inode object from which a link is being removed and a parent directory that was hosting the link. Thus, the set of objects are identified as comprising the inode object and the parent directory.

In another example, execution of a rename metadata operation is tracked to determine that the rename metadata operation modifies a first directory within which a file being renamed was stored, a second directory into which the file being renamed will be stored, and the file. Thus, the set of objects are identified as comprising the first directory, the second directory, and the file. If the second directory comprises a second file having the same name as the file that will be stored within the second directory, then the tracking of the execution of the rename metadata operation will determine that the second file will be modified because the rename metadata operation overwrites the second file with the file. Thus, the set of objects may also comprise the second file.

In another example, execution of a set attribute metadata operation is tracked to determine that the set attribute metadata operation modifies an object whose attribute (e.g., a size, ownership information, etc.) is being set by the set attribute metadata operation. Thus, the set of objects are identified as comprising the object. In this way, execution of the metadata operations are tracked to determine what objects are changed by the execution of such metadata operations.

At 304, a set of identifiers of the set of objects are stored in association with the metadata operation. The set of identifiers may comprise file identifiers, directory identifiers, and volume identifiers. In one example, the set of identifiers are stored in a data structure. In another example, the set of identifiers are stored within a message of the metadata operation, such as within a scratch area in a message payload (e.g., the message may comprise the metadata operation and the scratch area, which may be stored within an NVLog for later replay or transmitted to a second computing device for replay as part of a replication scheme).

In one example of metadata operation execution, the metadata operation is executed by a source file system of the first computing environment, such as upon data within a source volume. The first computing environment may have a replication relationship with a second computing environment (e.g., a second client device, a second server, a different computer within the cloud environment or a different cloud environment, etc.). For example, data of the source volume may be replicated to a destination volume hosted by the second computing environment. The replication may occur by replicating incoming operations that are locally executed by the source file system upon the source volume, and transmitting the replicated operations to the second computing environment for replay (e.g., execution) by a destination file system of the second computing environment upon the destination volume. In this way, the metadata operation may be transmitted to the second computing environment for replay upon the destination volume, such as for execution by a rapid cutover engine that provides semi-synchronous replication.

In another example of metadata operation execution, the metadata operation may be executed upon data within an NVRAM or other type of cache, and is logged within an NVLog of a node. The NVLog is used to track execution of operations not yet flushed to persistent storage such as to a disk drive, but instead are executed within the NVRAM as part of a caching technique. When a replay triggering event occurs (e.g., the node panics, the node is taken over by a high availability partner node, the node boots up, etc.), the operations tracked within the NVLog are replayed.

At 306, a determination is made that the metadata operation is to be replayed for a target file system. In one example where the metadata operation was logged into the NVLog and executed against the NVRAM, replay of the metadata operation from the NVLog to flush the contents of the NVRAM to storage is determined based upon an occurrence of the replay triggering event. The replay triggering event corresponds to NVLog replay post panic of the node, such as when the high availability partner node takes over or the node reboots after the panic.

In another example where the metadata operation was executed upon the source volume hosted by the first computing environment and was replicated to the second computing environment for replay (execution) upon the destination volume, replay of the metadata operation is triggered based upon various trigger conditions. For example, receipt of the metadata operation by the second computing environment triggers the replay of the metadata operation. In another example, replicated operations may be queued, such as by a replication cutover engine that implements semi-synchronous replication for the second computing environment, into a replication queue. Operations may be dequeued and replayed from the replication queue.

At 308, a tracking data structure is queried using the set of identifiers of the set of objects that were modified by the initial execution of the metadata operation to determine whether the metadata operation is independent or dependent with respect to pending operations already dispatched to the target file system for execution (replay). The tracking data structure is used to track identifiers of objects that will be modified by operations dispatched, such as from the NVLog or replication queue, to the target file system for replay (execution). If the set of identifiers do not match any identifiers within the tracking data structure, then the metadata operation is independent of pending operations already dispatched to the target file system, and thus will not modify objects being modified by the pending operations. Accordingly, the metadata operation is dispatched to the target file system for replay, at 310. In this way, the metadata operation can be executed in parallel with the pending operations without having to wait for the pending operations to complete first. This significantly improves the speed of replay and utilization of resources by executing metadata operations in parallel with other operations. At the time of dispatching the metadata operation to the target file system, the set of identifiers are populated into the tracking data structure to indicate that the set of objects will be modified by the metadata operation.

If at least one identifier within the set of identifiers matches at least one identifier within the tracking data structure, then the metadata operation is dependent upon one or more pending operations already dispatched to the target file system, and thus will modify at least one object that will be modified by the one or more pending operations. Accordingly, replay of the metadata operation is withheld, at 312. In one example, the metadata operation may be requeued and evaluated later, such as after a threshold amount of time, to see if the metadata operation can be replayed. In another example, the metadata operation is serially dispatched to the target file system for replay after the pending operations have been complete. In this way, the destination volume will be consistent with the source volume because objects are modified at the destination volume in the same order the objects were modified at the source volume.

Similarly, data operations may be replayed either in parallel or serially with respect to pending operations already dispatched to the target file system. For example, a determination is made that a data operation is to be replayed for the target file system (e.g., the data operation may be logged within the NVLog and must be replayed from the NVLog to storage or may be queued within the replication queue for execution upon the destination volume). The data operation is evaluated to identify an object (e.g., a file that is being written to) that will be modified by the replay of the data operation. The tracking data structure is queried using an identifier of the object. If the identifier does not match any identifiers within the tracking data structure, then the data operation is dispatched to the target file system for replay. The tracking data structure is populated with the identifier to indicate that the object will be modified by the data operation dispatched to the target file system for replay. For example, the data operation is serially dispatched to the target file system for execution after the pending dispatched operations are complete.

In one example where a set of operations are to be replayed for the target file system, identifiers of objects that were modified by the set of operations during an initial execution (e.g., execution upon the NVRAM or the source volume) and the tracking data structure are used to identify operations that are dependent upon one another and operations that are independent of one another. In this way, dependent operations are dispatched to the target file system for serial execution in an order of which the dependent operations were initially executed. The order of execution may be preserved using sequence numbers assigned to each operation to indicate the order each operation was executed during the initial execution. Independent operations are dispatched to the target file system for parallel execution.

Figure 4:
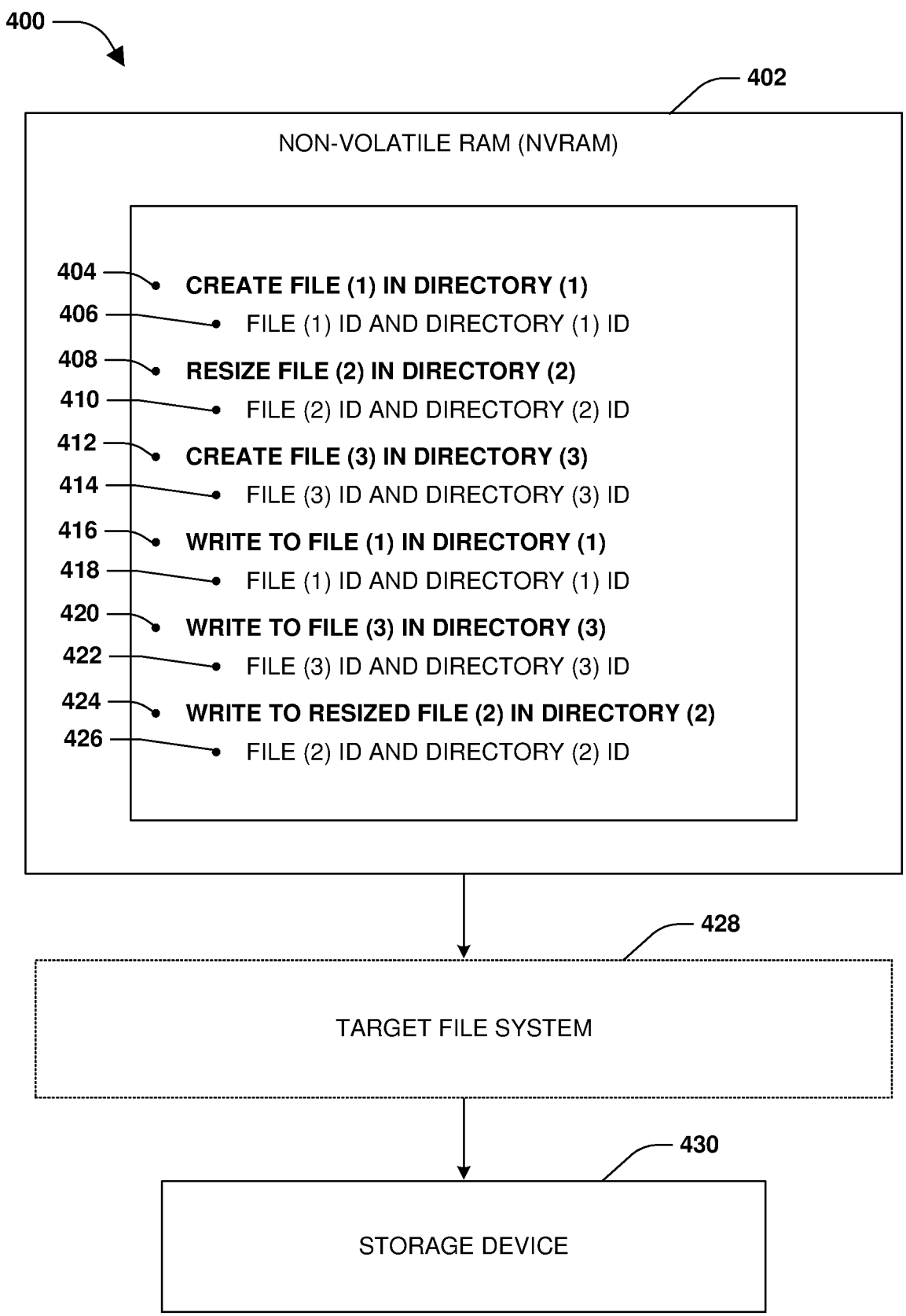
FIG. 4 is a component block diagram illustrating an example system for replaying metadata and data operations.

FIG. 4 illustrates an example of a system 400 for replaying metadata and data operations. A computing device may comprise an NVRAM 402 that is used for caching, such as for caching of modify operations. In particular, operations, such as write operations, metadata operations, and/or other types of modify operations, are cached within the NVRAM 402 and logged within an NVLog. In this way, the operations are initially executed upon the NVRAM 402. At an occurrence of a replay triggering event (e.g., the node rebooting after a system panic or a high availability partner node taking over for the node due to the system panic), the cached operations are replayed to storage (e.g., flushed to persistent storage).

In one example of initially executing (e.g., caching) operations, a first operation 404 to create a file (1) within a directory (1) is received and executed upon the NVRAM 402. The execution of the first operation 404 is tracked to determine that the file (1) and the directory (1) are modified by the execution of the first operation 404. Accordingly, a first set of identifiers 406 comprising a file (1) identifier and a directory (1) identifier are stored in association with the first operation 404. A second operation 408 to resize a file (2) that is stored within a directory (2) is received and executed upon the NVRAM 402. The execution of the second operation 408 is tracked to determine that the file (2) and the directory (2) are modified by the execution of the second operation 408. Accordingly, a second set of identifiers 410 comprising a file (2) identifier and a directory (2) identifier are stored in association with the second operation 408.

A third operation 412 to create a file (3) within a directory (3) is received and executed upon the NVRAM 402. The execution of the third operation 412 is tracked to determine that the file (3) and the directory (3) are modified by the execution of the third operation 412. Accordingly, a third set of identifiers 414 comprising a file (3) identifier and a directory (3) identifier are stored in association with the third operation 412. A fourth operation 416 to write data to the file (1) within the directory (1) is received and executed upon the NVRAM 402. The execution of the fourth operation 416 is tracked to determine that the file (1) and the directory (1) are modified by the execution of the fourth operation 416. Accordingly, a fourth set of identifiers 418 comprising the file (1) identifier and the directory (1) identifier are stored in association with the fourth operation 416.

A fifth operation 420 to write data to the file (3) within the directory (3) is received and executed upon the NVRAM 402. The execution of the fifth operation 420 is tracked to determine that the file (3) and the directory (3) are modified by the execution of the fifth operation 420. Accordingly, a fifth set of identifiers 422 comprising the file (3) identifier and the directory (3) identifier are stored in association with the fifth operation 420. A sixth operation 424 to write data to the resized file (2) within the directory (2) is received and executed upon the NVRAM 402. The execution of the sixth operation 424 is tracked to determine that the file (2) and the directory (2) are modified by the execution of the sixth operation 424. Accordingly, a sixth set of identifiers 426 comprising the file (2) identifier and the directory (2) identifier are stored in association with the sixth operation 424.

During replay of the operations by a target file system 428 to flush the NVRAM 402 to a storage device 430, the sets of identifiers are evaluated to determine what operations can be replayed/executed in parallel and what operations are to be replayed/executed serially with respect to one another. For example, the first operation 404, the second operation 408, and the third operation 412 are independent of one another because there is no overlap of what objects will be modified by the first operation 404, the second operation 408, and the third operation 412. Accordingly, the first operation 404, the second operation 408, and the third operation 412 can be replayed in parallel with respect to one another.

The fourth operation 416 is dependent upon the first operation 404, and thus the fourth operation 416 will be withheld from being replayed until the first operation 404 is complete because the first operation 404 must first create the file (1) before the file (1) can be written to by the fourth operation 416. The sixth operation 424 is dependent upon the second operation 408, and thus the sixth operation 424 will be withheld from being replayed until the second operation 408 is complete because the second operation 408 must first resize the file (2) before the sixth operation 424 can write to the resized file (2). The fifth operation 420 is dependent upon the third operation 412, and thus the fifth operation 420 will be withheld from being replayed until the third operation 412 is complete because the third operation 412 must first create the file (3) before the file (3) can be written to by the fifth operation 420. The fourth operation 416, the fifth operation 420, and the sixth operation 424 are independent of one another because there is no overlap of what objects will be modified by the fourth operation 416, the fifth operation 420, and the sixth operation 424. Accordingly, the fourth operation 416, the fifth operation 420, and the sixth operation 424 can be replayed in parallel with respect to one another. In this way, the operations are dispatched to the target file system 428 in a manner (e.g., some serially and/or some in parallel) that preserves the order with which objects were modified when the operations were initially executed upon the NVRAM 402. In this way, a state of the storage device 430 (e.g., what data is stored, a directory structure, names of objects, etc.) is consistent with a state of the NVRAM 402.

Figure 5:
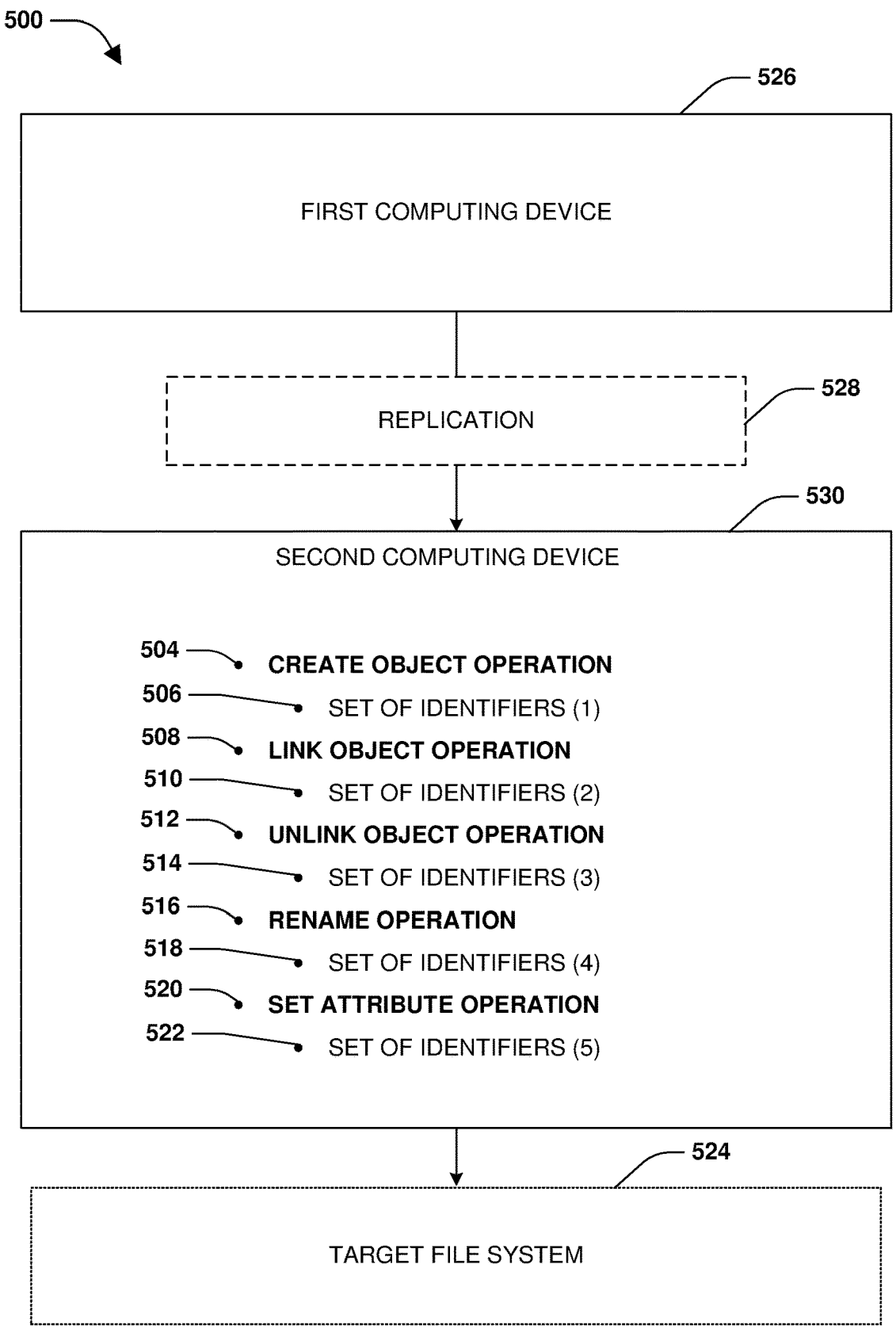
FIG. 5 is a component block diagram illustrating an example system for replaying metadata and data operations as part of a replication operation.

FIG. 5 illustrates an example of a system 500 for replaying metadata and data operations. A first computing device 526 may have a replication relationship (e.g., a semi-synchronous replication relationship, a synchronous replication relationship, etc.) with a second computing device 530. For example, data of a source volume hosted by the first computing device 526 may be replicated to a destination volume hosted by the second computing device 530 by replicating incoming operations that are executed upon the source volume to the second computing device 530 for execution upon the destination volume by a target file system 524.

In one example, a create object operation 504 is executed by the first computing device 526 upon the source volume. The execution is tracked to identify a set of identifiers (1) 506 of objects modified by the execution of the create object operation 504. A link object operation 508 is executed by the first computing device 526 upon the source volume. The execution is tracked to identify a set of identifiers (2) 510 of objects modified by the execution of the link object operation 508. An unlink object operation 512 is executed by the first computing device 526 upon the source volume. The execution is tracked to identify a set of identifiers (3) 514 of objects modified by the execution of the unlink object operation 512. A rename operation 516 is executed by the first computing device 526 upon the source volume. The execution is tracked to identify a set of identifiers (4) 518 of objects modified by the execution of the rename operation 516. A set attribute operation 520 is executed by the first computing device 526 upon the source volume. The execution is tracked to identify a set of identifiers (5) 522 of objects modified by the execution of the set attribute operation 520.

The first computing device 526 replicates the operations, and transmits 528 the replicated operations and the sets of identifiers to the second computing device 530 for replay by the target file system 524. The sets of identifiers are evaluated to determine which operations can be replayed in parallel with respect to one another and which operations are to be replayed serially with respect to one another (determine which operations are dependent on other operations completing first). In this way, some operations may be dispatched to the target file system 524 for parallel execution while other operations may be dispatched to the target file system 524 for serial execution.

Figure 6:
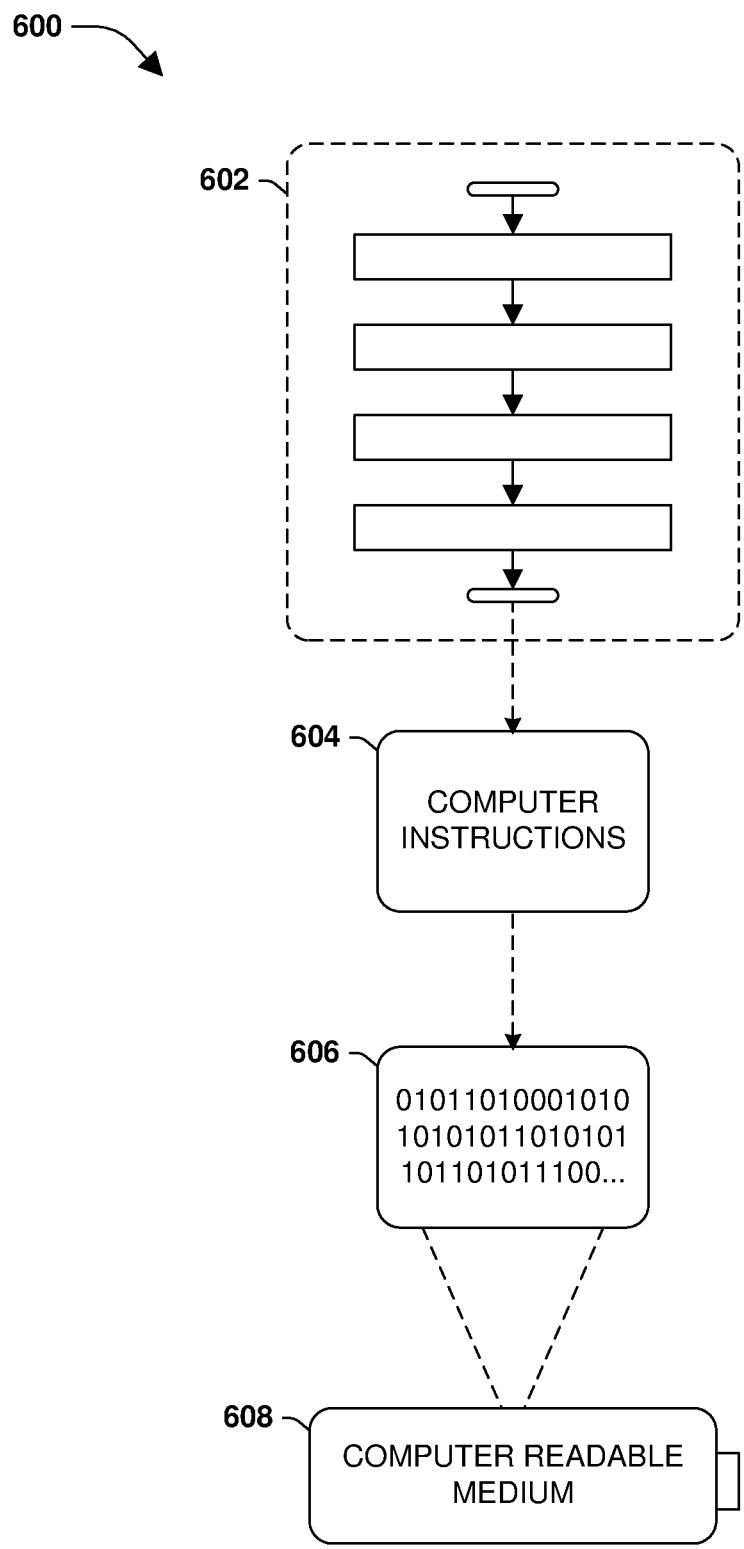
FIG. 6 is an example of a computer readable medium in which an embodiment of the invention may be implemented.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises a processor-executable computer instructions 604 configured to operate according to one or more of the principles set forth herein. In some embodiments, the processor-executable computer instructions 604 are configured to perform a method 602, such as at least some of the exemplary method 300 of FIG. 3, for example. In some embodiments, the processor-executable computer instructions 604 are configured to implement a system, such as at least some of the exemplary system 400 of FIG. 4 and/or at least some of the exemplary system 500 of FIG. 5, for example. Many such computer-readable media are contemplated to operate in accordance with the techniques presented herein.

Figure 7:
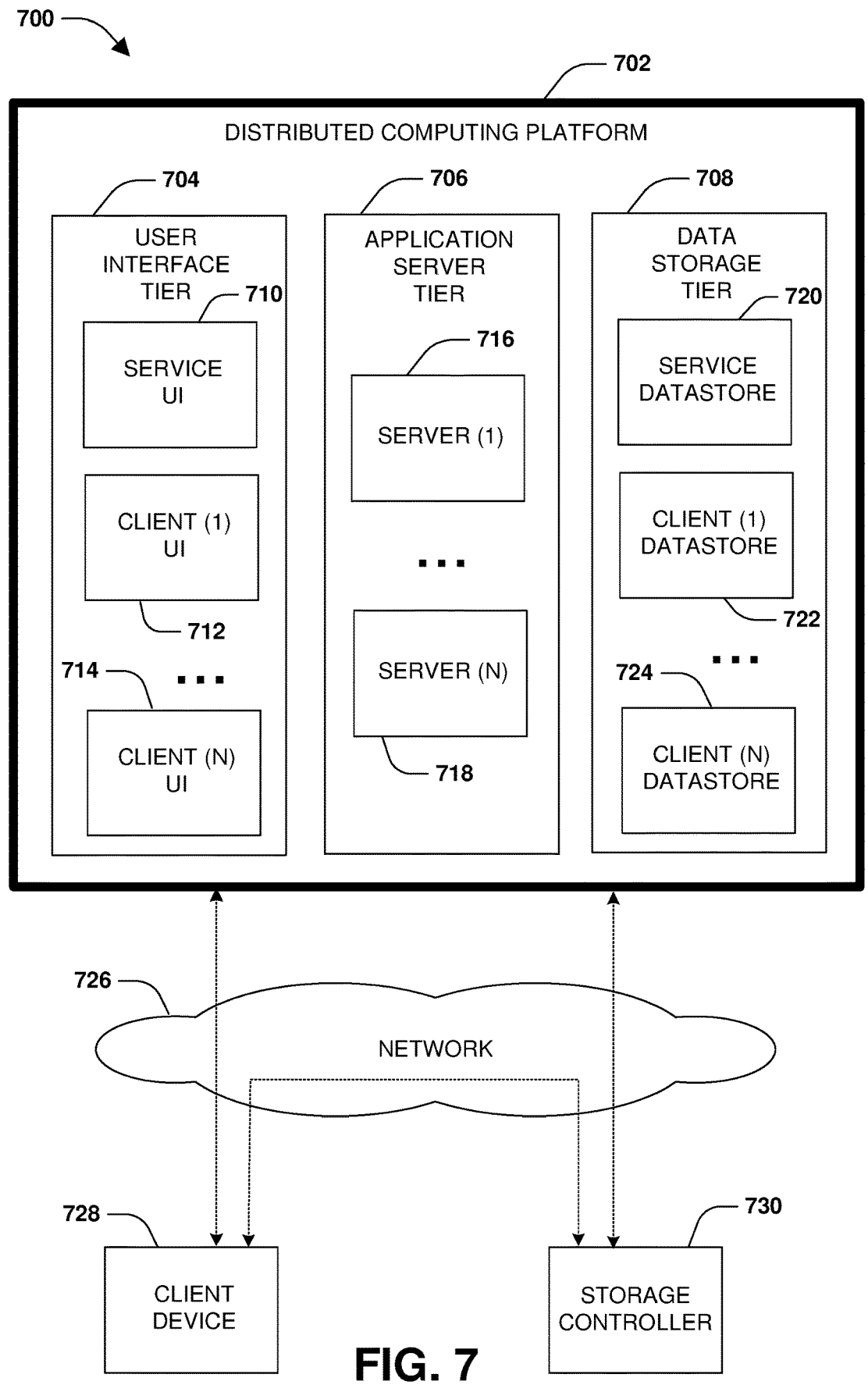
FIG. 7 is a component block diagram illustrating an example computing environment in which an embodiment of the invention may be implemented.

FIG. 7 is a diagram illustrating an example operating environment 700 in which an embodiment of the techniques described herein may be implemented. In one example, the techniques described herein may be implemented within a client device 728, such as a laptop, tablet, personal computer, mobile device, wearable device, etc. In another example, the techniques described herein may be implemented within a storage controller 730, such as a node configured to manage the storage and access to data on behalf of the client device 728 and/or other client devices. In another example, the techniques described herein may be implemented within a distributed computing platform 702 such as a cloud computing environment (e.g., a cloud storage environment, a multi-tenant platform, etc.) configured to manage the storage and access to data on behalf of the client device 728 and/or other client devices.

In yet another example, at least some of the techniques described herein are implemented across one or more of the client device 728, the storage controller 730, and the distributed computing platform 702. For example, the client device 728 may transmit operations, such as data operations to read data and write data and metadata operations (e.g., a create file operation, a rename directory operation, a resize operation, a set attribute operation, etc.), over a network 726 to the storage controller 730 for implementation by the storage controller 730 upon storage. The storage controller 730 may store data associated with the operations within volumes or other data objects/structures hosted within locally attached storage, remote storage hosted by other computing devices accessible over the network 726, storage provided by the distributed computing platform 702, etc. The storage controller 730 may replicate the data and/or the operations to other computing devices so that one or more replicas, such as a destination storage volume that is maintained as a replica of a source storage volume, are maintained. Such replicas can be used for disaster recovery and failover.

The storage controller 730 may store the data or a portion thereof within storage hosted by the distributed computing platform 702 by transmitting the data to the distributed computing platform 702. In one example, the storage controller 730 may locally store frequently accessed data within locally attached storage. Less frequently accessed data may be transmitted to the distributed computing platform 702 for storage within a data storage tier 708. The data storage tier 708 may store data within a service data store 720, and may store client specific data within client data stores assigned to such clients such as a client (1) data store 722 used to store data of a client (1) and a client (N) data store 724 used to store data of a client (N). The data stores may be physical storage devices or may be defined as logical storage, such as a virtual volume, LUNs, or other logical organizations of data that can be defined across one or more physical storage devices. In another example, the storage controller 730 transmits and stores all client data to the distributed computing platform 702. In yet another example, the client device 728 transmits and stores the data directly to the distributed computing platform 702 without the use of the storage controller 730.

The management of storage and access to data can be performed by one or more storage virtual machines (SMVs) or other storage applications that provide software as a service (SaaS) such as storage software services. In one example, an SVM may be hosted within the client device 728, within the storage controller 730, or within the distributed computing platform 702 such as by the application server tier 706. In another example, one or more SVMs may be hosted across one or more of the client device 728, the storage controller 730, and the distributed computing platform 702.

In one example of the distributed computing platform 702, one or more SVMs may be hosted by the application server tier 706. For example, a server (1) 716 is configured to host SVMs used to execute applications such as storage applications that manage the storage of data of the client (1) within the client (1) data store 722. Thus, an SVM executing on the server (1) 716 may receive data and/or operations from the client device 728 and/or the storage controller 730 over the network 726. The SVM executes a storage application to process the operations and/or store the data within the client (1) data store 722. The SVM may transmit a response back to the client device 728 and/or the storage controller 730 over the network 726, such as a success message or an error message. In this way, the application server tier 706 may host SVMs, services, and/or other storage applications using the server (1) 716, the server (N) 718, etc.

A user interface tier 704 of the distributed computing platform 702 may provide the client device 728 and/or the storage controller 730 with access to user interfaces associated with the storage and access of data and/or other services provided by the distributed computing platform 702. In an example, a service user interface 710 may be accessible from the distributed computing platform 702 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 712, a client (N) user interface 714, etc. The client (1) can access various services and resources subscribed to by the client (1) through the client (1) user interface 712, such as access to a web service, a development environment, a human resource application, a warehouse tracking application, and/or other services and resources provided by the application server tier 706, which may use data stored within the data storage tier 708.

The client device 728 and/or the storage controller 730 may subscribe to certain types and amounts of services and resources provided by the distributed computing platform 702. For example, the client device 728 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 730 can establish a subscription to have access to certain services and resources of the distributed computing platform 702.

As shown, a variety of clients, such as the client device 728 and the storage controller 730, incorporating and/or incorporated into a variety of computing devices may communicate with the distributed computing platform 702 through one or more networks, such as the network 726. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 702, such as a multi-tenant business data processing platform or cloud computing environment, may include multiple processing tiers, including the user interface tier 704, the application server tier 706, and a data storage tier 708. The user interface tier 704 may maintain multiple user interfaces, including graphical user interfaces and/or web-based interfaces. The user interfaces may include the service user interface 710 for a service to provide access to applications and data for a client (e.g., a "tenant") of the service, as well as one or more user interfaces that have been specialized/customized in accordance with user specific requirements, which may be accessed via one or more APIs.

The service user interface 710 may include components enabling a tenant to administer the tenant's participation in the functions and capabilities provided by the distributed computing platform 702, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 708 may include one or more data stores, which may include the service data store 720 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 702 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   storing identifiers of objects that are modified by execution of a metadata operation into a scratch area of a message payload of a message, wherein the message, comprising the metadata operation and the identifiers within the scratch area of the message payload, is stored into a non-volatile log (NVLog);
   in response to determining that the metadata operation is to be replayed for a target file system, querying, using a first identifier stored in the message, a tracking data structure used to track identifiers of objects that are pending to be modified by pending operations dispatched to the target file system;
   in response to the first identifier not occurring within the tracking data structure, dispatching the metadata operation to the target file system for replay; and
   in response to the first identifier occurring within the tracking data structure:
   withholding dispatch of the metadata operation to the target file system for replay until the tracking data structure no longer comprises the first identifier;
   queuing the metadata operation for reevaluation after a threshold amount of time to see if the metadata operation can be dispatched for replay; and
   in response to the threshold amount of time occurring, querying, using the first identifier stored in the message, the tracking data structure to determine whether the first identifier of an object that is to be modified by the metadata operation occurs within the tracking data structure.

2. The method of claim 1, comprising:
   in response to dispatching the metadata operation, populating the tracking data structure with the first identifier to indicate that the object is pending to be modified by the metadata operation dispatched to the target file system for replay.

3. The method of claim 1, comprising:
   dispatching a data operation to the target file system for replay based upon a second identifier of a second object targeted by the data operation not occurring within the tracking data structure, else, withholding dispatch of the data operation to the target file system for replay based upon the second identifier occurring within the tracking data structure.

4. The method of claim 3, comprising:
   in response to dispatching the data operation, populating the second identifier into the tracking data structure to indicate that the second object is pending to be modified by the data operation dispatched to the target file system for replay.

5. The method of claim 1, comprising:
   using identifiers of objects that were modified by a set of operations during an initial execution and the tracking data structure to identify dependent operations within the set of operations that are dependent upon one another based upon the dependent operations modifying the same objects, wherein the dependent operations are serially dispatched to the target file system for serial execution.

6. The method of claim 1, comprising:
   using identifiers of objects that were modified by a set of operations during an initial execution and the tracking data structure to identify independent operations within the set of operations that are independent from one another based upon the independent operations not modifying the same objects, wherein the independent operations are dispatched to the target file system for parallel execution.

7. The method of claim 1, wherein the first identifier comprises at least one of a file identifier of a file or a directory identifier of a directory.

8. The method of claim 1, wherein the first identifier comprises an inode number of an object.

9. A non-transitory machine readable medium comprising instructions for performing a method, which when executed by a machine, causes the machine to:
   store identifiers of objects that are modified by execution of a metadata operation into a scratch area of a message payload of a message, wherein the message, comprising the metadata operation and the identifiers within the scratch area of the message payload, is stored into a non-volatile log (NVLog);
   in response to determining that the metadata operation is to be replayed for a target file system, querying, using a first identifier stored in the message, a tracking data structure used to track identifiers of objects that are pending to be modified by pending operations dispatched to the target file system;
   in response to the first identifier not occurring within the tracking data structure, dispatching the metadata operation to the target file system for replay; and
   in response to the first identifier occurring within the tracking data structure:
   withholding dispatch of the metadata operation to the target file system for replay until the tracking data structure no longer comprises the first identifier;
   queuing the metadata operation for reevaluation after a threshold amount of time to see if the metadata operation can be dispatched for replay; and
   in response to the threshold amount of time occurring, querying, using the first identifier stored in the message, the tracking data structure to determine whether the first identifier of an object that is to be modified by the metadata operation occurs within the tracking data structure.

10. The non-transitory machine readable medium of claim 9, wherein the instructions cause the machine to:
    facilitate execution of the metadata operation upon a source file system of a first computing environment and replay execution of the metadata operation upon the target file system of a second computing environment as a replication of the metadata operation.

11. The non-transitory machine readable medium of claim 10, wherein the target file system is a semi-synchronous replication target for the source file system, wherein operations executed at the source file system are replicated to the target file system for replay at the target file system.

12. The non-transitory machine readable medium of claim 9, wherein the instructions cause the machine to:

facilitate execution of the metadata operation within a non-volatile memory (NVRAM), wherein the execution is tracked using a non-volatile log (NVLog) used to track operations executed within the NVRAM and not yet flushed to storage, and wherein the metadata operation is dispatched to the target file system during a replay of the NVLog to flush NVRAM contents to the storage.

13. The non-transitory machine readable medium of claim 9, wherein the metadata operation comprises a create object metadata operation, and wherein the instructions cause the machine to:

track execution of the create object metadata operation to determine that the create object metadata operation modifies a parent directory object and a new object being created within the parent directory object by the create object metadata operation.

14. The non-transitory machine readable medium of claim 9, wherein the metadata operation comprises a link object metadata operation, and wherein the instructions cause the machine to:

track execution of the link object metadata operation to determine that the link object metadata operation modifies an inode object to which a new link is to be established and a new parent directory hosting the new link.

15. A computing device comprising:

a memory comprising machine executable code having stored thereon instructions for performing a method; and a processor coupled to the memory, the processor configured to execute the machine executable code to cause the processor to:

store identifiers of objects that are modified by execution of a metadata operation into a scratch area of a message payload of a message, wherein the message, comprising the metadata operation and the identifiers within the scratch area of the message payload, is stored into a non-volatile log (NVLog);

in response to determining that the metadata operation is to be replayed for a target file system, querying, using a first identifier stored in the message, a tracking data structure used to track identifiers of objects that are pending to be modified by pending operations dispatched to the target file system;

in response to the first identifier not occurring within the tracking data structure, dispatching the metadata operation to the target file system for replay; and in response to the first identifier occurring within the tracking data structure:

withholding dispatch of the metadata operation to the target file system for replay until the tracking data structure no longer comprises the first identifier;

queuing the metadata operation for reevaluation after a threshold amount of time to see if the metadata operation can be dispatched for replay; and in response to the threshold amount of time occurring, querying, using the first identifier stored in the message, the tracking data structure to determine whether the first identifier of an object that is to be modified by the metadata operation occurs within the tracking data structure.

16. The computing device of claim 15, wherein the metadata operation comprises an unlink object metadata operation, and wherein the machine executable code causes the processor to:

track execution of the unlink object metadata operation to determine that the unlink object metadata operation modifies an inode object from which a link is being removed and a parent directory that was hosting the link.

17. The computing device of claim 15, wherein the metadata operation comprises a rename metadata operation, and wherein the machine executable code causes the processor to:

track execution of the rename metadata operation to determine that the rename metadata operation modifies a first directory within which a file being renamed was stored, a second directory into which the file being renamed will be stored, and the file.

18. The computing device of claim 17, wherein the machine executable code causes the processor to:

track the execution of the rename metadata operation to determine that the rename metadata operation modifies a second file, within the second directory, having a same name as the file, wherein the rename metadata operation overwrites the second file with the file.

19. The computing device of claim 15, wherein the metadata operation comprises a set attribute metadata operation, and wherein the machine executable code causes the processor to:

track execution of the set attribute metadata operation to determine that the set attribute metadata operation modifies an object whose attribute is being set by the set attribute metadata operation.

* * * * *